Oct. 17, 1933.  T. C. DELAVAL-CROW  1,930,586
LUBRICANT RETAINER FOR AXLES AND THE LIKE
Filed Sept. 10, 1928
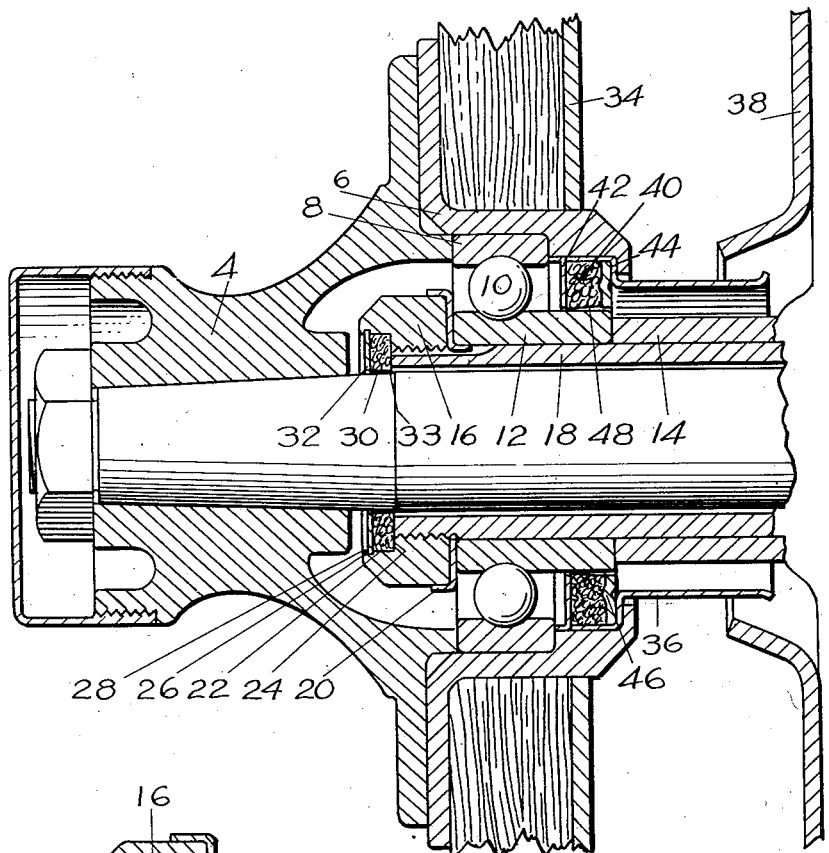
FIG. I.
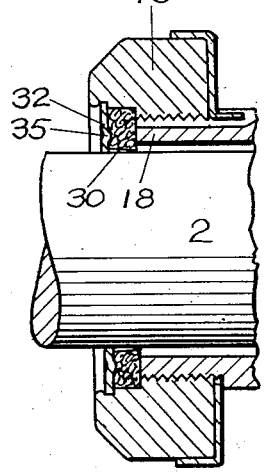
FIG. 2.
INVENTOR:
THOMAS C. DELAVAL-CROW,
BY Gales P. Moore
HIS ATTORNEY.

Patented Oct. 17, 1933

1,930,586

UNITED STATES PATENT OFFICE 1,930,586

LUBRICANT RETAINER FOR AXLES AND THE LIKE

Thomas C. Delaval-Crow, Bristol, Conn., assignor to The New Departure Manufacturing Company, Bristol Conn., a corporation of Connecticut Application September 10, 1928
Serial No. 304,956

10 Claims. (Cl. 308—134)

This invention relates to lubricant retainers for axles and the like and comprises all the features of novelty herein disclosed. One difficulty which occurs more especially with three-quarter floating axles is leakage of oil from the axle casing to the wheel bearing and brake drum. The oil surges outwardly towards the wheels on curves and works around the dead axle into the hub and bearing, diluting the bearing grease and building up a pressure by centrifugal force which forces it past the bearing seal to the brake. An object of the invention, accordingly, is to provide a lubricant retainer for axles and the like which will eliminate the above mentioned difficulty. Another object is to provide a combined bearing holding device and lubricant retainer.

To these and other ends and to improve generally and in detail upon devices of this character, the invention further consists in the various matters hereinafter disclosed and claimed. In its broader aspects, the invention is not necessarily limited to the specific construction selected for illustrative purposes in the accompanying drawing in which Fig. 1 is a sectional view of a three quarter floating axle and Fig. 2 is a sectional view of a modified detail.

The numeral 2 indicates a live axle or drive shaft keyed to a hub section 4 attached to a flanged hub member 6 which carries the outer race ring 8 of a ball bearing 10. The inner race ring 12 of the bearing is longer than the outer race ring and abuts against a sleeve 14 where it is held by a clamping nut 16 threaded on a dead axle or casing 18 and locked by a washer 20. The nut is made to project beyond the end of the dead axle or casing and is provided with a recess 22 forming a seat of larger diameter than the threaded portion and providing an annular shoulder 24 arranged in approximate alignment with the end of the axle but not beyond it when the nut is set up. Outside the recess 22 is a groove 26, and outside the groove is an annular lip 28 having a diameter less than the groove and greater than the recess. A packing washer 30 of felt or the like fits around the shaft and occupies the recess, fitting the latter and being held against the shoulder 24 by a metal retaining washer 32 which is forced into the groove. The packing washer projects radially beyond the threads from its permanent seat and the retaining washer extends alongside of it to furnish lateral support. The metal washer is conveniently inserted by first dishing it or making it conical to pass the lip 28 after which it is pressed out flat and so expanded into the groove. The nut and packing washer provide a unit-handling clamp and seal for holding the bearing on the axle and sealing the space between the axle and the drive shaft without any dependence on the hub for holding either.

When the nut is set up tight, the metal washer 32 forces the felt washer 30 against the end of the dead axle or casing 18 and against the periphery of the live axle or drive shaft 2. The shaft usually has a slight taper so that the washer presses more strongly against it at the point 33 so forming a conical capillary space which helps to prevent oil from working outwardly along the axle to the bearing and the brake drum 34. When the shaft is straight, the retaining washer 32 is preferably provided with a side rib 35 or annular protuberance spaced a little from the peripheral edge of the washer as indicated in Fig. 2, thereby contracting the adjacent side of the packing washer and causing the hole in the packing washer to assume a slightly conical form for capillary action. The hub member 6 carries the usual flanged shield 36 which projects through an opening in the brake cover plate 38. To further insure against leakage of grease and oil to the brake, a washer 40 of felt or the like is interposed between the extended inner race ring 12 and the hub end of the shield 36. The felt washer is compressed between a flanged washer 42 and a washer 44 having a side rib 46. The side rib 46 causes the opening in the felt washer 40 to assume a slightly conical form thereby making a capillary space at 48 which tends to draw oil towards the bearing and so prevents leakage. The extended inner race ring 12 protects the felt washer 40 against damage during assembly of the parts on the axle.

I claim:

1. In a device of the character described, a dead axle, a wheel hub, a bearing between the axle and the wheel hub, a drive shaft extending through the axle, a nut for holding the bearing on the axle, the nut having a portion projecting beyond the end of the axle and provided with a recess having an annular shoulder, a compressible packing washer set in the recess against the shoulder and fitting around the drive shaft, the nut having a groove outside the recess, and a retaining washer fixed in the groove and pressing the packing washer directly against the end of the axle; substantially as described.

2. In a device of the character described, a casing, a member rotatable with respect to the casing, a bearing between the casing and the rotatable member, a drive shaft extending through the casing and connected to the rotatable member, and a unit-handling bearing clamping device and lubricant seal, said device comprising a nut threaded on the casing against a part of the bearing, a compressible packing washer in the nut and fitting around the shaft, and means for securing the packing washer permanently in the nut and holding said washer pressed directly against the end of the casing; substantially as described.

3. In a device of the character described, a dead axle, a wheel hub, a bearing between the axle and the wheel hub, a drive shaft extending through the axle, a bearing clamping member mounted on the axle for holding the bearing thereon, the clamping member having a portion projecting beyond the end of the axle and a shoulder, a compressible packing washer at the end of the axle and extending from the projecting portion of the clamping member to the drive shaft, and means secured to the clamping member and engaging one side of the packing washer to hold the other side pressed directly against the end of the axle and against the shoulder; substantially as described.

4. In a device of the character described, a dead axle, a wheel hub, a bearing between the axle and the wheel hub, a drive shaft extending through the axle, a bearing clamping member mounted on the axle for holding the bearing thereon, the clamping member having a portion projecting beyond the end of the axle, a compressible packing washer at the end of the axle and extending from the projecting portion of the clamping member to the drive shaft, a holding washer secured to the clamping member and engaging one side of the packing washer to hold the other side pressed directly against the end of the axle, said holding washer having a rib spaced from its edge and distorting the packing washer to produce a capillary recess at the shaft; substantially as described.

5. In a device of the character described, a casing, a member rotatable with respect to the casing, a bearing between the casing and the rotatable member, a drive shaft extending through the casing and connected to the rotatable member, in combination with a unit-handling bearing clamping device and lubricant seal comprising a nut threaded on the casing against the bearing, the nut having a portion projecting beyond the casing and provided with a recess terminating in a shoulder, a compressible packing washer fitting in the recess and projecting radially into engagement with the drive shaft, and means secured to the nut for holding the packing washer against the shoulder, said means extending alongside of the radially projecting portion of the packing washer to hold the latter against the end of the casing; substantially as described.

6. In a unit-handling bearing clamping device and lubricant seal, a member adapted to engage a bearing part and having a threaded portion and a portion with a packing recess of different diameter, a shoulder between said portions of different diameter, a compressible packing washer fitting against the peripheral wall of the recess and projecting radially from the recess and the shoulder beyond the threaded portion, and means on the member for holding a portion of the packing washer against the shoulder and laterally supporting its radially projecting portion; substantially as described.

7. In a unit-handling bearing clamping device and lubricant seal, a member adapted to engage a bearing part and having a threaded portion and a portion with a packing recess of different diameter, a shoulder between said portions of different diameter, a compressible packing washer fitting against the peripheral wall of the recess and projecting radially therefrom beyond the threaded portion, and a retaining washer secured to the recessed portion of the member for holding a portion of the packing washer against the shoulder, said retaining washer extending alongside the packing washer and adapted to hold the radially projecting portion of the packing washer laterally against the part to be sealed; substantially as described.

8. In a unit-handling bearing clamping device and lubricant seal, a member adapted to engage a bearing part and having a threaded portion and a portion with a packing recess of different diameter, a shoulder between said portions of different diameter, a compressible packing washer fitting against the peripheral wall of the recess and projecting radially therefrom beyond the threaded portion, a retaining washer secured to the recessed portion of the member for holding a portion of the packing washer against the shoulder, said retaining washer extending radially alongside the packing washer and having an annular protuberance spaced from its peripheral edge for contracting the adjacent side of the packing washer to produce a taper on the adjacent peripheral wall of the packing washer; substantially as described.

9. In a unit-handling clamping device and lubricant seal, a member having an internally threaded portion terminating in a shoulder, the member having an internal recess beyond the shoulder and of larger diameter than the threaded portion, a compressible packing washer fitting against the peripheral wall of the recess and against the shoulder and having an opening of smaller diameter than the threaded portion of the member whereby the packing washer has portions which are both larger and smaller than the threaded portion, and means secured to the member for holding that portion of the packing washer which is larger than the threaded portion against the shoulder; substantially as described.

10. In a unit-handling clamping device and lubricant seal, a member having an internally threaded portion and a plain seat portion projecting axially beyond the threaded portion, a compressible packing washer substantially coextensive with and fitted to said projecting seat portion and extending radially of the member, and a retaining washer secured to the projecting portion of the member and extending alongside of the packing washer to furnish lateral support thereto; substantially as described.

THOMAS C. DELAVAL-CROW.